June 5, 1928.

E. McWILLIAM

THERMOMETER CASE

Filed Oct. 27, 1927

1,672,388

Inventor:
Edward McWilliam
By Macleod, Calver, Copeland & Dike
Attorneys.

Patented June 5, 1928.

1,672,388

UNITED STATES PATENT OFFICE.

EDWARD McWILLIAM, OF BOSTON, MASSACHUSETTS, ASSIGNOR TO STANDARD THERMOMETER INC., OF BOSTON, MASSACHUSETTS, A CORPORATION OF MASSACHUSETTS.

THERMOMETER CASE.

Application filed October 27, 1927. Serial No. 229,214.

This invention relates to a new and useful improvement in thermometer cases. It has special reference to a thermometer case for a bi-metallic thermometer having an index hand and a dial on which the index hand indicates the temperature. In thermometers of this type, the index hand is usually mounted on an arbor to which one end of a bi-metallic spring is attached, the other end of the spring being attached to a fixed support. The entire mechanism is enclosed in a circular case having a glass or otherwise transparent front face through which the dial may be seen. The rim and the back of the case are usually metallic and it is suspended from a wall or other suitable support where it is exposed to the outside atmosphere. The rim is usually formed with apertures opening directly into the interior of the case to afford ventilation. As usually constructed, when it is hung where rain and snow can fall on the thermometer or when it is exposed to dense fog, the snow and rain or condensation from the fog or vapors enter the casing through the apertures and trickle down inside the case and cause rusting of the metal of the works and discoloration of the dial. The object of the present invention is to provide a case which is fully ventilated and yet protected against the admission of either snow or rain or other liquid condensation into the interior of the case where it will come in contact with the works.

The invention will be more fully understood from the following description when taken in connection with the accompanying drawings and the novel features thereof will be pointed out and clearly defined in the claims at the close of this specification.

Figure 1:
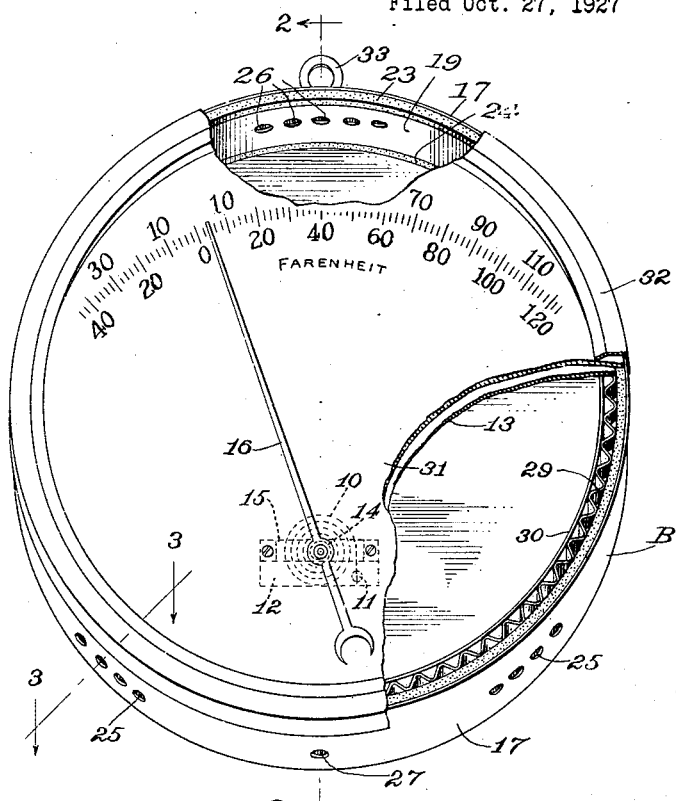
Fig. 1 is a perspective view partly broken away of a thermometer and case embodying the invention.
Figure 2:
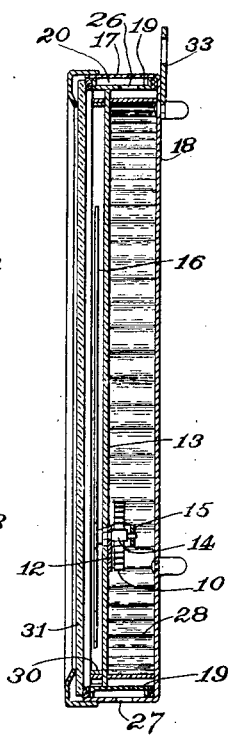
Fig. 2 is a section on line 2—2 of Fig. 1.
Figure 3:
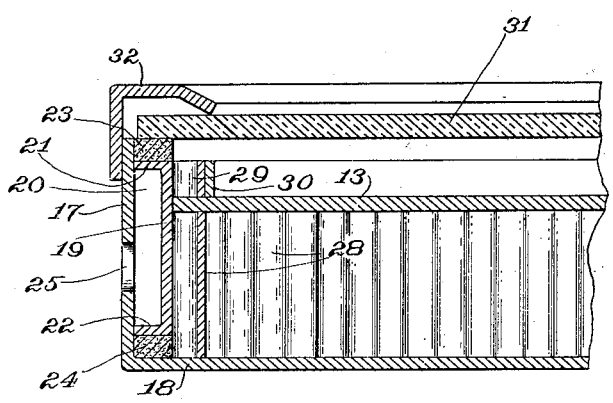
Fig. 3 is a section on line 3—3, of Fig. 1, on an enlarged scale.

Referring to the drawings the thermometer mechanism comprises a bi-metallic spring 10, one end of which is secured to a post 11 mounted on a plate 12 secured to the rear face of a disk 13, the other end of said spring being secured to an arbor 14, one end of which is journalled in a bracket 15 attached to the back face of said disk 13, the other end of said arbor passing through said disk and having secured thereto a pointer 16. The front face of the said disk has delineated thereon a dial graduated to indicate temperature degrees. The mechanism thus far described is common and well known.

The said dial and attached mechanism are mounted in a circular case. The said case has a double annular wall comprising two concentric annular members with an annular air space between them, closed at the two edges of said air space, the two annular members having ventilating apertures so disposed that the said apertures in the outer member do not register with the apertures in the inner member. The outer annular member is indicated at 17 and is provided with a back wall 18 which closes the back side of the case and forms the back of the thermometer case. Preferably the said back wall 18 is made integral with the said outer annular wall 17, making a cup shaped box.

The inner annular wall is shown at 19 and is of sufficiently less diameter than the outer wall 17 to leave an annular space 20 between said two walls. The said inner annular member 19 is formed with flanges 21 and 22 respectively at its two edges which extend outwardly to the outer wall 17 so as to close said annular space both at the front and at the rear of the case. Preferably, there are provided cushions or pads 23 and 24 respectively on the outer faces of the two flanges 21 and 22. The pad 24 lies between the back wall 18 of the case and the adjacent flange 22 of the inner wall or ring and the other pad 23 lies on the outer face of the flange 21 of the inner ring. These pads serve not only as cushions but also to absorb any moisture that might creep in.

The outer wall 17 is formed with a plurality of apertures 25 opening into the air space between the inner and outer walls, preferably located below the center or horizontal diameter of the case when the case is suspended in its normal position and the inner wall or ring 19 is formed with a plurality of apertures 26 in communication between the air space between the two walls and the interior of the case where the works are located. The apertures 26 are out of register with the apertures 25 in the outer case and are preferably located near the top of the said inner ring or wall as the thermometer is hung. The outer case is also formed with a drip aperature 27 at the bottom of said ring or wall.

By locating all of the apertures below the center line of the case, the case being of circular contour, there is very little danger of rain of snow entering the apertures in the outer ring and if any moisture does enter through said outer apertures into the space between the two rings it will run down on the inner wall of the outer ring and flow out through the aperture 27 in the lowest part of the outer ring. It would be impossible for any liquid to enter the interior of the case through the apertures 26 of the inner ring yet free ventilation will be afforded.

A ring 28 preferably of corrugated sheet metal is provided in the interior of the casing to serve as a seat for the dial plate 13, said dial plate is held to its seat on the ring 28 by a corrugated ring or strip 29 seated on the outer or dial face of the disk said corrugated ring 29 being held in place by a clamping ring 30 said clamping ring preferably being of spring metal which will press outward against said corrugated ring 29. The glass front 31 is seated upon the pad 23 and is held in place by a flanged ring 32 one flange of which covers the outer pad 23 and laps over onto the said glass front and the outer peripheral flange of said ring fits tightly down for a short distance over onto the outer periphery of the outer ring 17.

The case is preferably provided with a hanger ring 33 at its top.

What I claim is:

1. A thermometer case having a double peripheral wall with an air space between the two walls, the outer wall having ventilating apertures below the horizontal median line of the case, and the inner wall having an aperture or apertures opening from the space between the two walls into the interior of the case, the apertures through the inner wall being out of alinement with the apertures through the outer wall.

2. A circular thermometer case, having a double peripheral wall with an air space between the two walls, the outer wall having ventilating apertures below the horizontal median line of the case and the inner wall having ventilating apertures above the horizontal median line.

3. A thermometer case having a double peripheral wall, one member of which is of greater diameter than the other with an air space between the two wall members, the outer wall having a ventilating aperture or apertures opening into the said air space, and the inner wall having an aperture or apertures opening from said air space into the interior of the case, the apertures of the inner wall being out of alinement with the apertures of the outer wall.

4. A thermometer case having a double peripheral wall with an air space between the two walls, the outer wall having a ventilating aperture or apertures opening into the said air space below the horizontal diameter of the case, and the inner wall having an aperture or apertures opening from said air space into the interior of the case, the apertures of the inner wall being out of alinement with the apertures of the outer wall.

5. A thermometer case, having a double peripheral wall with an air space between the two walls, the outer wall having a ventilating aperture or apertures opening into the said air space below the horizontal diameter, and the inner wall having an aperture or apertures opening from said air space into the interior of the case, the apertures of the inner wall being out of alinement with the apertures of the outer wall, the outer wall having a drip opening in the lower part thereof.

6. A thermometer case for a bi-metallic thermometer, said case having a double peripheral wall consisting of two concentric rings, one of which is of sufficiently less diameter than the other to leave an air space between the two rings, the inner ring having outwardly extending radial flanges at its edges which bridge the space between the two rings to form a closure between the rings at the two edges, ventilating apertures in the outer ring at points below the horizontal diameter of the rings, and ventilating apertures in the inner ring, said two sets of apertures being out of alinement with each other.

7. A thermometer case for a bi-metallic thermometer, said case having a double peripheral wall consisting of two concentric rings one of which is of sufficiently less diameter than the other to leave an air space between the two rings, the inner ring having outwardly extending radial flanges at its edges, which bridge the space between the two rings at the two edges and form side closures, the outer ring having a drip aperture in the lower part thereof, ventilating apertures in the outer ring below the horizontal diameter of the ring and ventilating apertures in the inner ring, said two sets of apertures being out of alinement with each other.

8. A thermometer case for a bi-metallic thermometer, said case having a double peripheral wall consisting of two concentric rings one of which is of sufficiently less diameter than the other to leave an air space between the two rings, the inner ring having outwardly extending radial flanges at its edges which bridge the space between the two rings to form a side closure to the space between the rings at the two edges, a pad on the outer face of each of said flanges, ventilating apertures in the outer ring at points below the horizontal diameter of the rings and ventilating apertures in the inner ring, said two sets of apertures being out of alinement with each other.

9. A thermometer case having a double peripheral wall with an air space between the two walls, the outer wall having a ventilating aperture or apertures opening into the said air space below the horizontal diameter of the two rings, and the inner wall having an aperture or apertures opening from said air space into the interior of the case, the apertures through the inner wall being out of alinement with the apertures through the outer wall, the outer wall having a drip opening in the lower part thereof, a closure at the front and back of said annular space, a closed back for the case, and a transparent front closure for the case.

In testimony whereof I affix my signature.

EDWARD McWILLIAM.